United States Patent [19]

Smoluchowski et al.

[11] 4,247,314
[45] Jan. 27, 1981

[54] MECHANICAL FILTER BAG SHAKER ASSEMBLY

[75] Inventors: Julian Smoluchowski, Lombard; Ray Wynn, Jr., Mundelein, both of Ill.

[73] Assignee: Flex-Kleen Corporation, Chicago, Ill.

[21] Appl. No.: 60,505

[22] Filed: Jul. 25, 1979

[51] Int. Cl.³ .............................................. B01D 46/04
[52] U.S. Cl. ................................. 55/304; 55/341 NT
[58] Field of Search ......................... 55/300, 304–305, 55/341 NT; 210/332, 407

[56] References Cited

U.S. PATENT DOCUMENTS

| | | | |
|---|---|---|---|
| 1,868,876 | 7/1932 | Boesger | 55/300 |
| 1,886,215 | 11/1932 | Newnam | 55/304 X |
| 2,204,590 | 6/1940 | Hamilton | 55/304 |
| 2,702,090 | 2/1955 | Brown et al. | 55/300 X |
| 3,395,519 | 8/1968 | Kleissler | 55/304 |
| 3,955,947 | 5/1976 | Hoon et al. | 55/304 X |

FOREIGN PATENT DOCUMENTS 2162764 12/1972 Fed. Rep. of Germany ............. 55/300

Primary Examiner—Kathleen J. Prunner
Attorney, Agent, or Firm—Kerkam, Stowell, Kondracki & Clarke

[57] ABSTRACT

Mechanical shaker assembly for filter bag supporting beams which eliminates problems involved with conventional shaker assembly linkage due to variations in the dimensions of the linkage members or the location of the bag suspension beams. The assembly includes horizontal beams mounted at their ends in bearings and the beams receive shafts attached to one end of the beams. Support hangers are attached to depend from the beams and the hangers are each connected to the upper end of a filter bag. Each of the shafts has attached thereto a lever arm and opposed lever arms are connected at their ends to length adjustable tie-rods. At least one of the lever arms is also connected by a length adjustable crank arm to a motor driven crank or eccentric.

4 Claims, 7 Drawing Figures

MECHANICAL FILTER BAG SHAKER ASSEMBLY

DESCRIPTION

1. Technical Field

This invention relates to filter bag shaking apparatus for use in a bag house having a plurality of filter bag supporting beams characterized in that the linkage between a source of reciprocating motion and the supporting beams reduces friction, thereby saving energy, and eliminates problems involved with a conventional shaker linkage assembly due to variations in the dimensions of the linkage members or variations in the location of the bag suspension beams.

2. Background of Prior Art

Shaker linkage is known to transmit an oscillatory motion from a rotating eccentric shaft to several bag suspension beams in a bag filter apparatus. The oscillation of the bag suspension beams shake the filter bags attached to the beam and cleans the filter bags by dislodging the accumulated particulate material.

Standard shaker linkage generally comprises a series of several bar links connected by a common shaker bar. The conventional linkage design requires that the spacing of the mounting holes in the common shaker bar exactly match the spacing of the bag suspension beams, and that all of the torque arms be identical. Any variation in the dimensions of the components or the location of the bag suspension beams makes the assembly of the shaker linkage difficult to assemble and often the mounting and connecting holes in such linkages are made large enough to accommodate normal misalignment. In such cases, the operation of the shaker linkage is adversely affected creating internal stresses in the connected parts which stresses are transferred to the bearings as excessive loads which often lead to premature failure of the bearings, and wasted energy.

Further, the excessive clearances required in the prior art mounting and connecting holes results in a "sloppy" linkage so that the linkage operates noisily and the connecting pins are subjected to sliding and impact loads which again result in their frequent failure.

BRIEF SUMMARY OF INVENTION

The present invention provides linkage members which eliminate the problems encountered in assembly and operation caused by misalignment and out-of-tolerance parts.

The invention may be summarized as a filter bag shaking apparatus for use in a bag house wherein the bag house has top, bottom, and side walls, a plurality of generally parallel beam members in the upper end of the bag house each of which has connection to the upper ends of a plurality of filter bags. The beams are pivotally mounted at one end of each of the beams to a side wall of the bag house, and a shaft is provided to connect the other end of each beam member and a bearing structure carried by the opposite side wall of the bag house. A lever arm is connected to the end of each of the shafts connected to the beam members, and a plurality of length adjustable tie-rods connect adjacent pairs of lever arms sequentially from one end, then from the other end of each of the lever arms. A further length adjustable tie-rod connects at least one of the lever arms to means for producing a reciprocating motion.

BRIEF DESCRIPTION OF DRAWING

The invention will be more particularly described in reference to the accompanying drawing wherein.

DETAILED DESCRIPTION OF INVENTION

Figure 1:
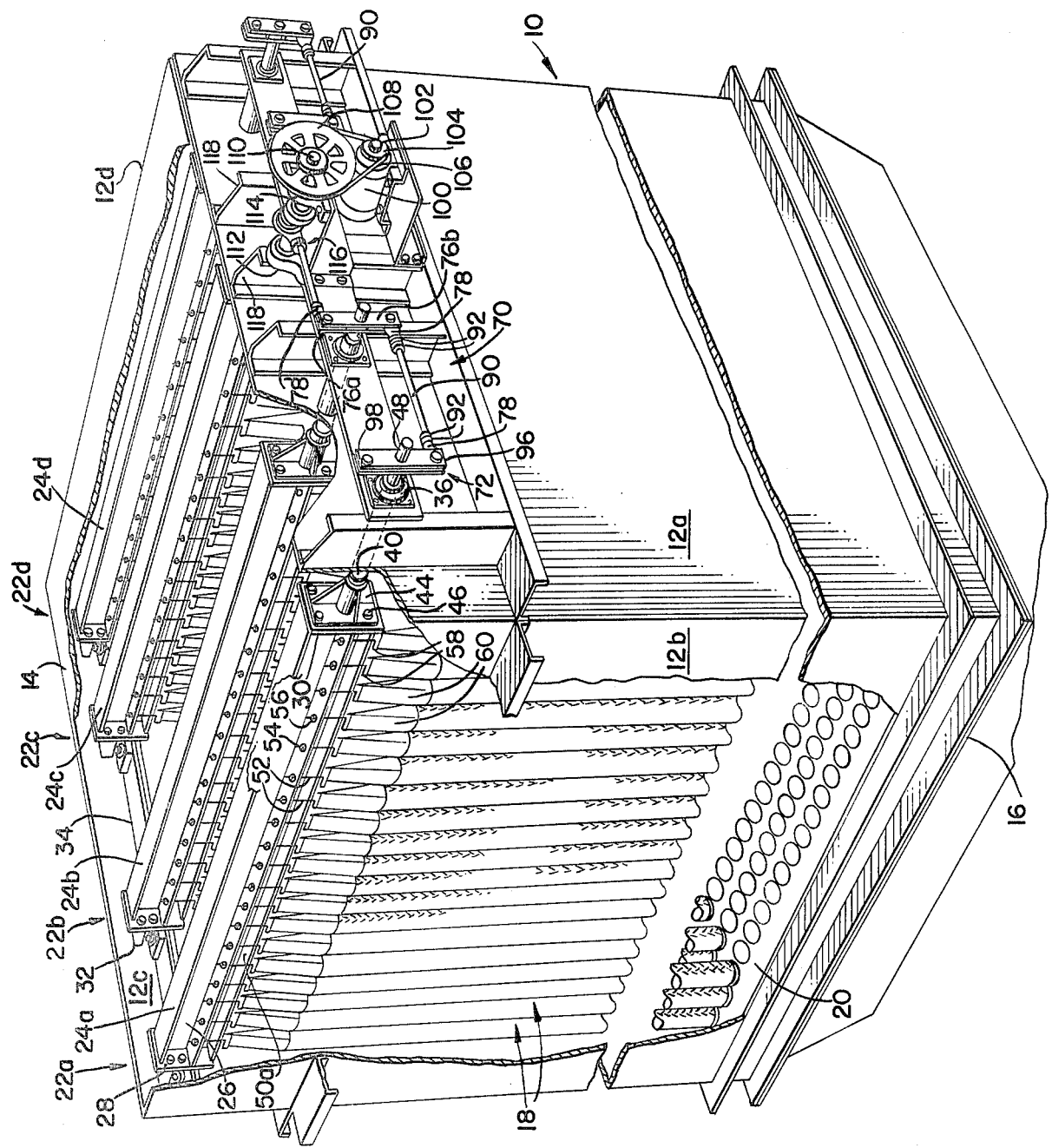
FIG. 1 is a fragmentary perspective view of a bag house having a mechanical bag shaking assembly constructed in accordance with the teachings of the invention.
Figure 2:
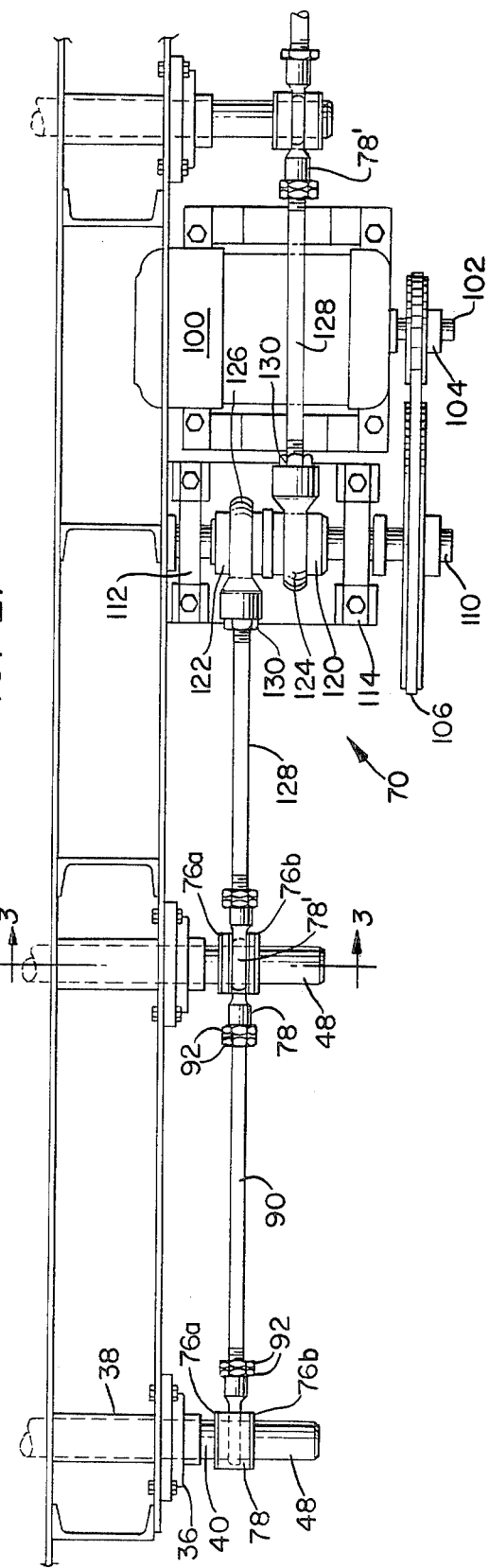
FIG. 2 is a top plan view of the bag shaking linkage members.

Referring to the drawing, FIG. 1, 10 generally designates a bag house having sidewalls 12a, 12b, and 12c, and 12d, top 14, base 16, and a dust receptacle.

Within the confines of the housing are a plurality of conventional filter bags generally designated 18 with the bags being anchored in a bag sheet 20 at the lower end of the housing. The bags are arranged in a plurality of pairs of rows 22a-d with each pair of rows being connected to a support beam 24a through 24d.

Figure 3:
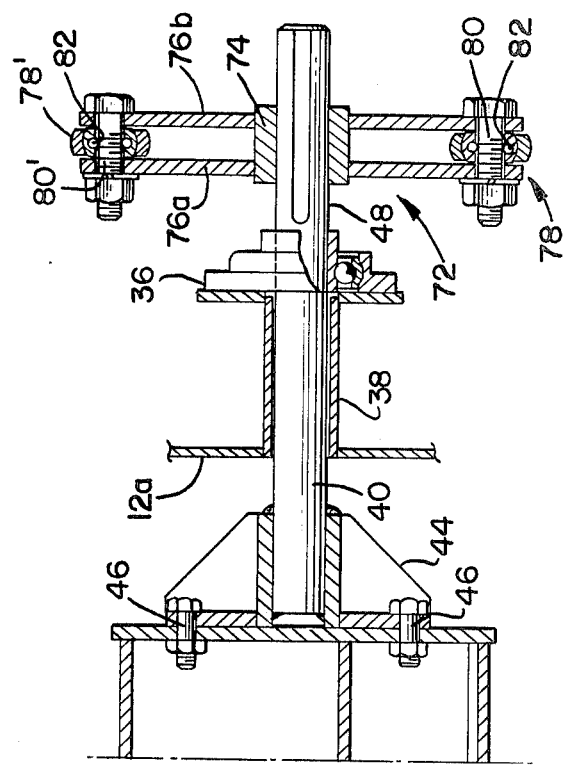
FIG. 3 is a section on line 3—3 of FIG. 2.

Each support beam 24a through 24d comprises a beam member 26 having end plates 28 and 30 secured thereto. End plate 28 of each beam is connected, for rotary motion along the axis of the beam by friction reducing knife edge bearing means 32, supported by a cross beam 34 which in turn is fixed to sidewall 12c of the bag house. The opposite end of each beam 24a-d is supported from the opposite wall 12a of the bag house via bearing means 36 and spacer element 38, FIG. 3 of the drawing. The bearing 36 and spacer 38 receive a shaft 40 which shaft is welded to a shaft housing 44 bolted as at 46 to the end plate 30 of each bag support beam. The length of the shaft 40 is such that an end 48 projects beyond the bearing 36, again as more clearly illustrated in, for example, FIG. 3 of the drawing. Thus, it will be seen that each beam 24a-d is mounted for rotary motion in a horizontal plane between sidewalls 12a and 12c of the housing 10.

Figure 4A:
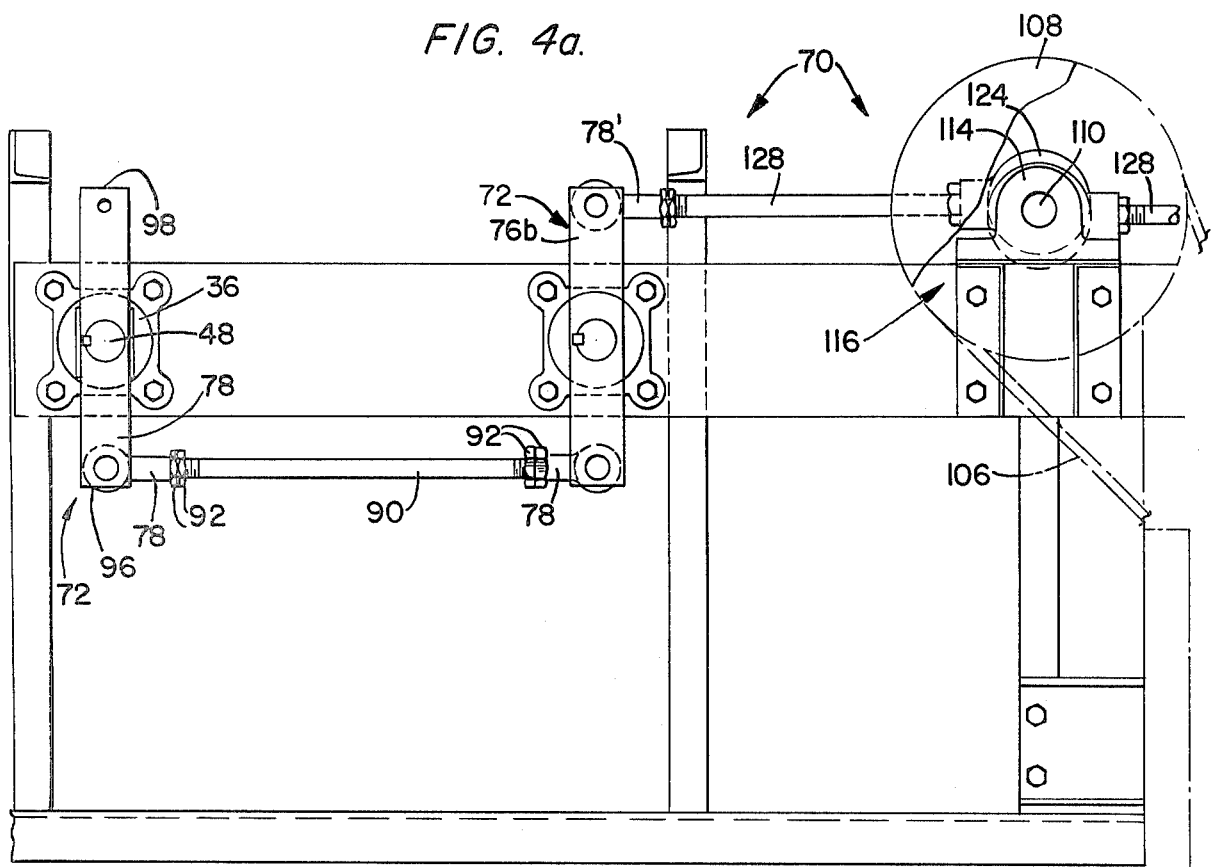
FIGS. 4a and 4b are enlarged vertical views of the shaker linkage illustrated in FIGS. 1-3.
Figure 4B:
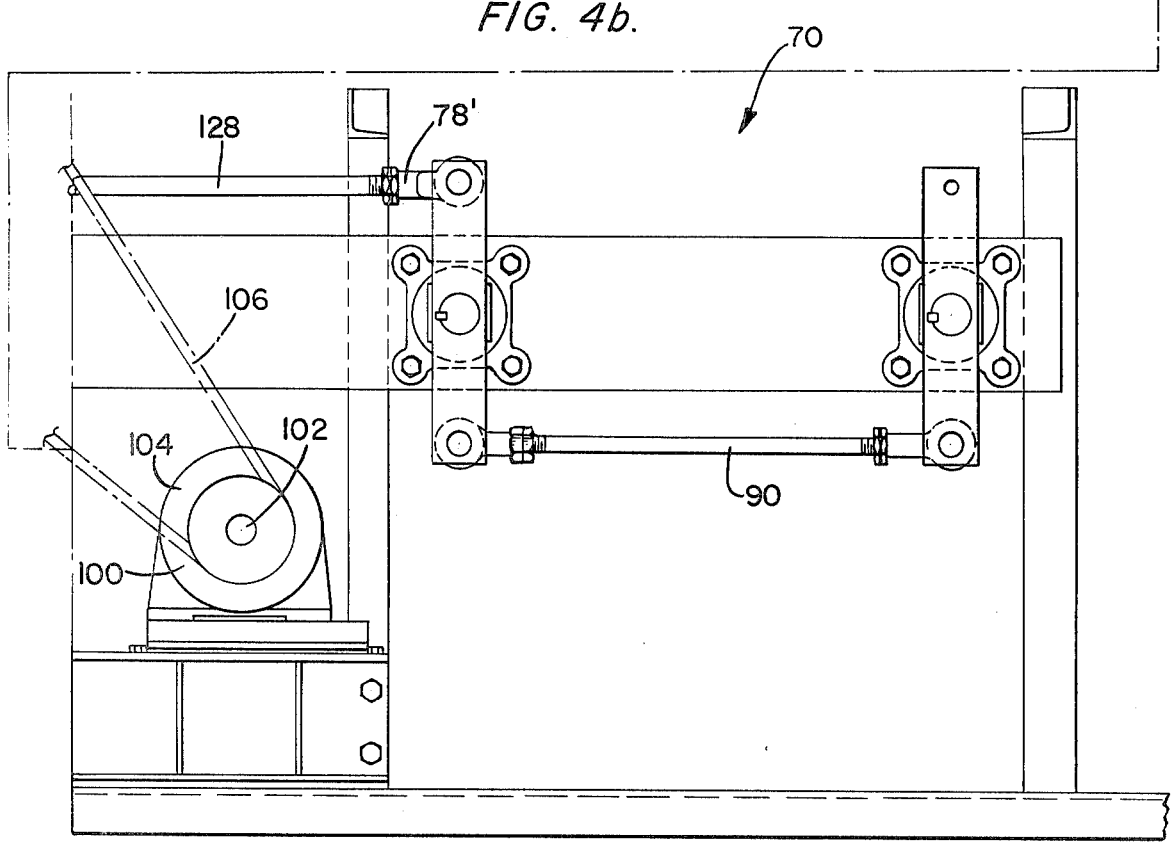
Figure 5:
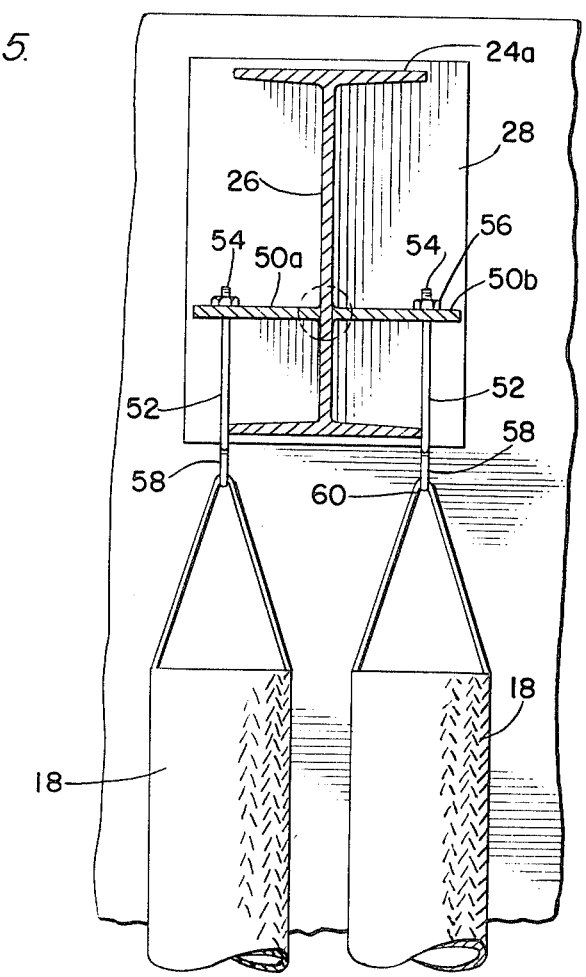
FIG. 5 is a transverse section through one of the rocker beam members of FIG. 1.

Each beam 24a-d has rigidly attached thereto, such as by welding, plate members 50a on one side of the web of each beam and 50b, FIG. 5, on the opposite side. The plate members 50a and 50b are substantially coextensive in length and parallel to the respective beams. Each plate 50a and 50b is provided with a plurality of bores which receive the bag hangers 52. The bag hangers 52 have threaded shanks 54 which receive nuts 56 for adjustably positioning each of the hangers 52. The lower end of each support or hanger 52 is provided with a recurved hanger portion 58 which receives a bag support strap 60 as more clearly illustrated in FIG. 1 of the drawing. Thus, it will be seen that upon oscillatory rocking of beams 24a-d the plural rows of bag filters 18 are caused to flutter or shake to dislodge material collected from the gas stream to be cleaned. The oscillatory movement is imparted to each of the beams 24a-d via the bag shaking linkage means of the present invention which is generally designated 70, FIG. 4a.

BAG SHAKING LINKAGE ASSEMBLY

Each shaft end 48 has rigidly keyed thereto a lever arm assembly 72. Each of the lever arms 72 includes a hub portion 74 and a pair of spaced bars 76a and 76b. The bars 76a and b are welded to the hub 74 and therefore rock in unison with the hub. The spacing between the bars 76a and b is such that a bearing type connector end 78 of an adjustable linkage is mountable therebetween on pins or bolts 80 provided with anti-friction bearing members 82. The external portion of each adjustable end 78 is internally bored and tapped to receive an end of length adjustable tie-rods 90, which length adjustable tie-rods are externally threaded and are locked in the desired position within its respective end 78 via a pair of lock nuts 92. As more clearly depicted in FIG. 4a it will be seen that adjacent pairs of lever arms 72 are connected by the length adjustable tie-rods 90 first at one end, for example 96, and then at the other end 98.

Means are provided in each assembly 70 for imparting generally reciprocating motion to the adjacent lever arm 72 and in the illustrated form of the invention the reciprocating motion is comprised of a rotary electric motor 100 having an output shaft 102 which has keyed thereto a pulley 104. It will be recognized by those skilled in the art that the motor 100 could be a rotary fluid motor, or a fluid actuated cylinder. The pulley 104 drives a belt 106 trained about a larger diameter pulley 108 which pulley is connected to the output end of a crank shaft 110. The crank shaft has one end rotatably mounted in a bearing 112 and an intermediate portion of the shaft is rotatably mounted in a second bearing 114 which bearings are mounted on support means generally designated 116 carried by beams 118 supported by the sidewall 12a of the bag house.

Between the pair of bearings 112 and 114 are, in the illustrated form of the invention, a pair of cranks 120 and 122 to which are journaled crank arm bearings 124 and 126. The outboard ends of crank arm bearings 124 and 126 are connected to second length adjustable tie-rods 128 which tie-rods are locked thereto via locking nuts 130. The opposite ends of the length adjustable tie-rods 128 are length adjustably connected to anti-friction bearing containing tie-rod connectors 78' journaled to pins 80' passing through the upper ends of bars 76a and 76b of a pair of the lever arms 72. Thus, upon rotation of the shaft 102 of motor 100 the cranks and crank arm bearings convert the rotary motion to reciprocating motion which in turn imparts rocking motion to a pair of the lever arms 72 to rock beams 24b and 24c and rocking of the lever arms also imparts rocking motion to beams 24a and 24d via length adjustable tie-rods 90.

Through the use of energy saving anti-friction bearings at the ends of connecting rods 90 and 128, these elements may be made lighter in weight, thus reducing the mass to be moved and providing further energy savings.

Figure 6:
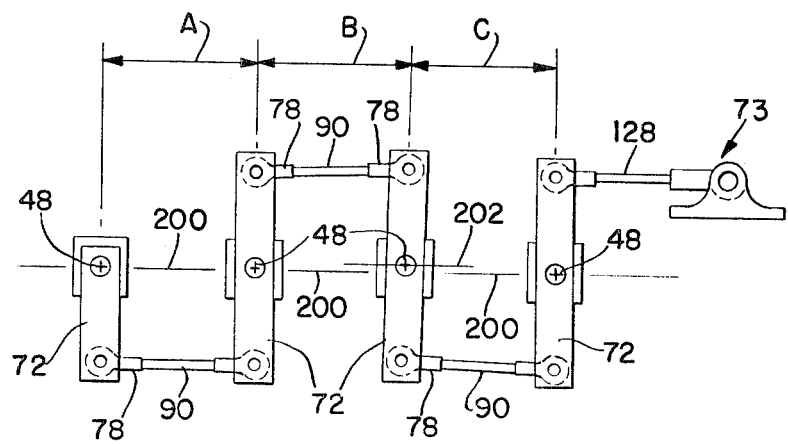
FIG. 6 is a diagrammatic view of linkage of the invention illustrating how the shaker linkage of the invention compensates for misalignment of the mounting means for the beam members supporting the bag filters and variations in the spacing between such beams.

Referring now to FIG. 6 of the drawing, the functional advantages of the present invention will be more fully described. FIG. 6 is a diagrammatic view of the novel linkage of the invention illustrating how the linkage compensates for: (a) misalignment of the shafts mounting the shaker or support beams; and (b) variation in spacing between such beams. In FIG. 6, elements depicted therein are provided with reference characters corresponding to those employed in the detailed description of the invention in reference to FIGS. 1 through 5. Broken line 200 is horizontal and the proper center for shafts 40 whereas line 202 considered with line 200 illustrates the vertical misalignment of one of the shafts connected to one of the rocker or support beams. Reference characters A, B, and C designate the distances between centers of four shafts 40, and it will be noted that each distance represented by the reference characters A, B and C is different.

In assembling the shaker linkage members the length of each rod 90 is so adjusted in respect to its bearing end 78 that there is no stress placed on the main bearings for shafts 40 nor on the connection between the shafts 90 and their connection to the lever arms 72. Thus, when the motor 100 or an eccentric drive diagrammatically illustrated at 73 in FIG. 6 causes tie-rod 128 to oscillate the lever arm 72, no stresses or other undesirable forces are applied to the mechanism whereby each of the rocker or support beams connected to the shafts 40 are smoothly oscillated providing noise-free long lasting life to the mechanism.

STATEMENT OF INDUSTRIAL APPLICATION

The mechanism of the invention provides linkage means between an eccentric drive and rocker arms for a filter bag shaking mechanism which automatically compensates for misalignment of the rocker bearings and spacing between the rocker shafts of the assembly thereby substantially eliminating excessive wear and noise often found in conventional bag filter shaking mechanisms. Also, with bearings 78' in lieu of bushings, less friction is encountered thereby conserving energy.

We claim:

1. Filter bag shaking apparatus for use in a bag house wherein the bag house has top, bottom, and sidewalls characterized by a plurality of generally parallel beam members in the upper end of the bag house, each of said beam members having connection to the upper end of a plurality of filter bags;
   means pivotally mounting one end of each beam member to a sidewall of the bag house;
   a shaft having a free end and an end connected to the other end of each beam member and rotatably mounted in an opposite sidewall of the bag house;
   a lever arm connected to the said free end of each said shaft;
   a plurality of length adjustable tie-rods connecting adjacent pairs of lever arms sequentially such that only one tie-rod connects any two adjacent lever arms and such that one of said tie-rods connects adjacent ends of two adjacent lever arms and other tie-rods connect the opposite ends of these two adjacent lever arms to the adjacent ends of the next adjacent lever arms;
   a rotary actuator having a rotating output shaft; and
   means for converting the rotating motion of the rotating output shaft from the rotary actuator to reciprocating motion and a further length adjustable tie-rod connecting at least one of said lever arms to the means for converting the rotating motion of the rotating output shaft to reciprocating motion.

2. The invention defined in claim 1 wherein length adjustment of the adjustable tie-rods is through threaded connectors at each end of the tie-rods.

3. The invention defined in claims 1 or 2 wherein a plurality of said further length adjustable tie-rods connect a plurality of said beam members each having connection to the upper ends of a plurality of filter bags to said means for converting the rotating motion of the rotating output shaft of the rotary actuator to reciprocating motion.

4. The invention defined in claim 1 wherein the converting means comprises a crank arm rotatably driven by the rotary actuator.

* * * * *